W. E. DOYAL AND R. HAGOPIAN.
VEHICLE.
APPLICATION FILED DEC. 20, 1919.
1,426,719.
Patented Aug. 22, 1922.
3 SHEETS—SHEET 1.
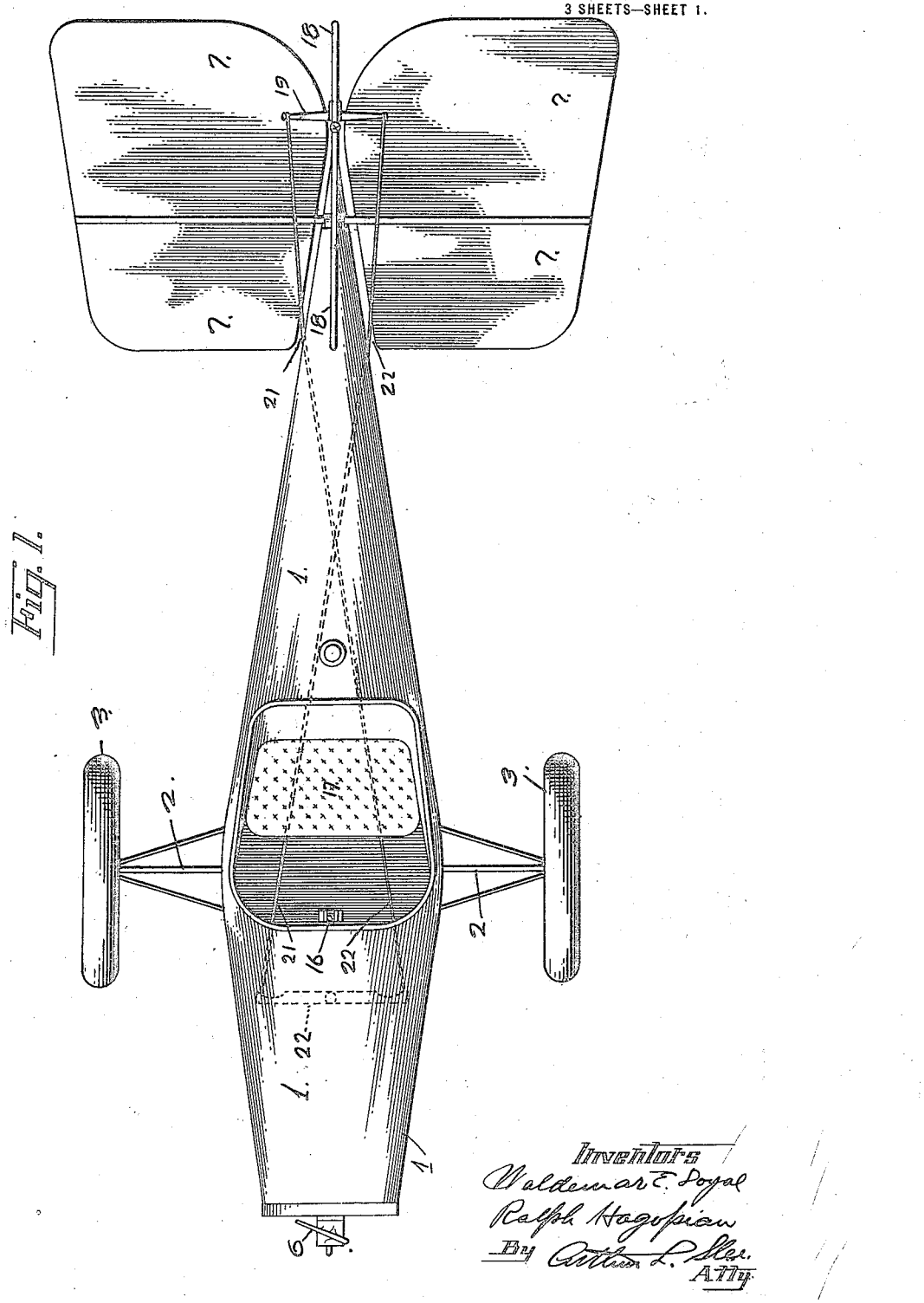

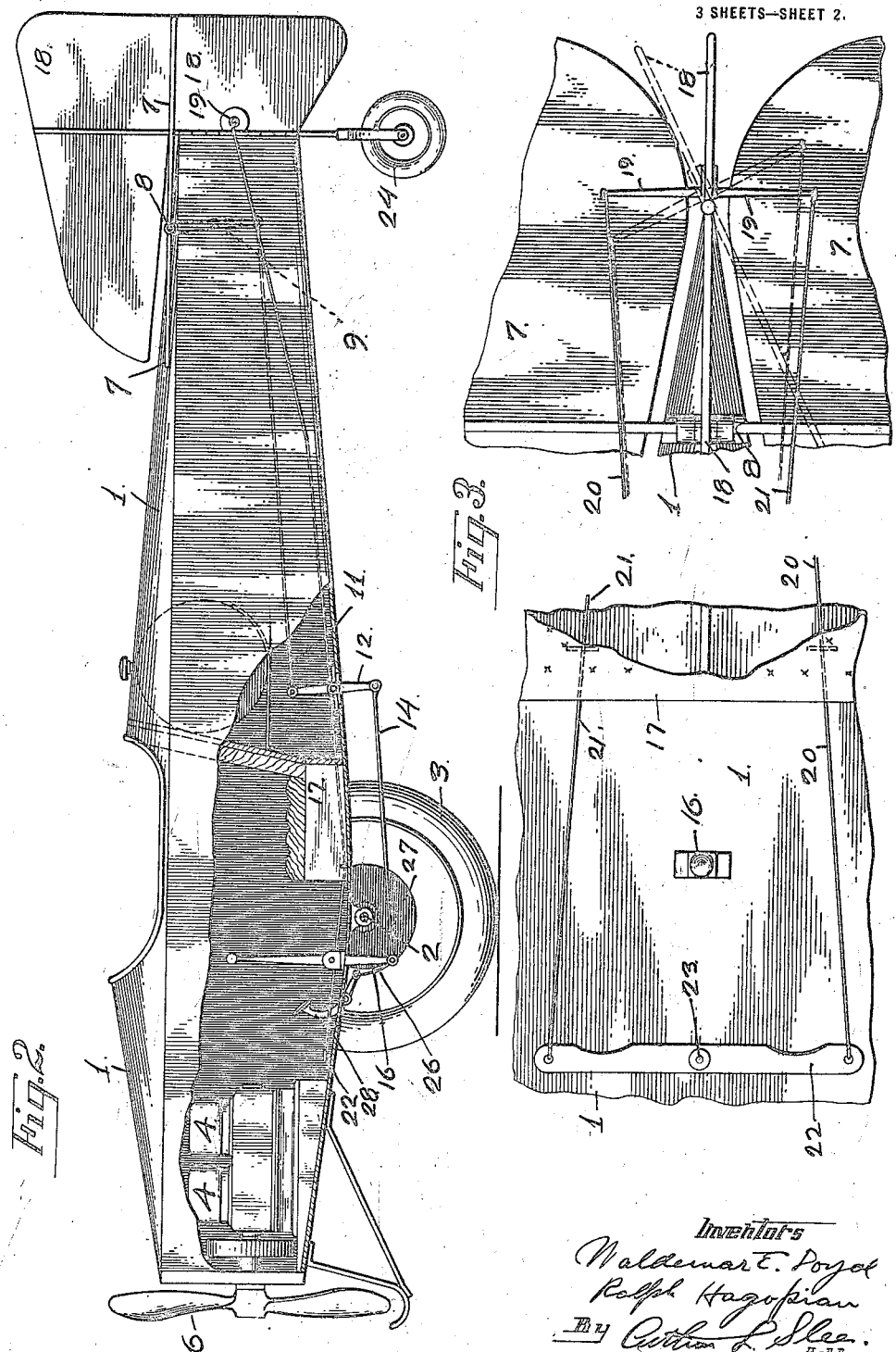

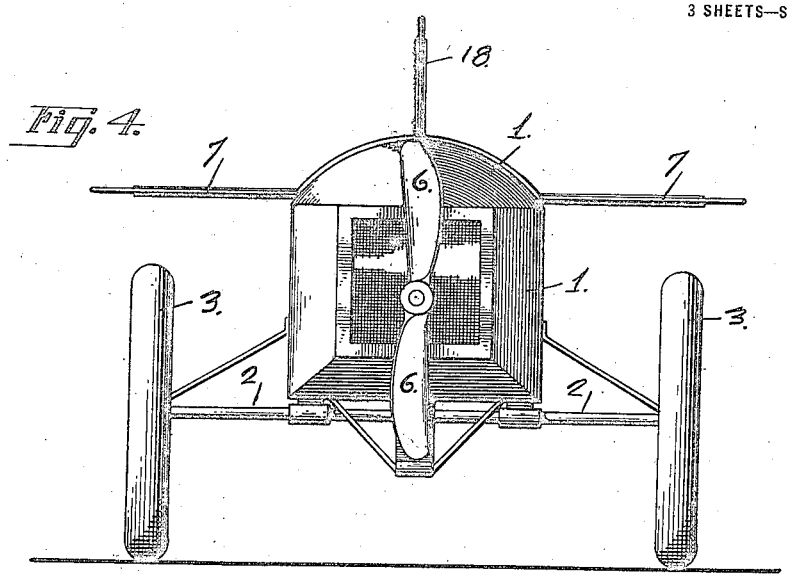
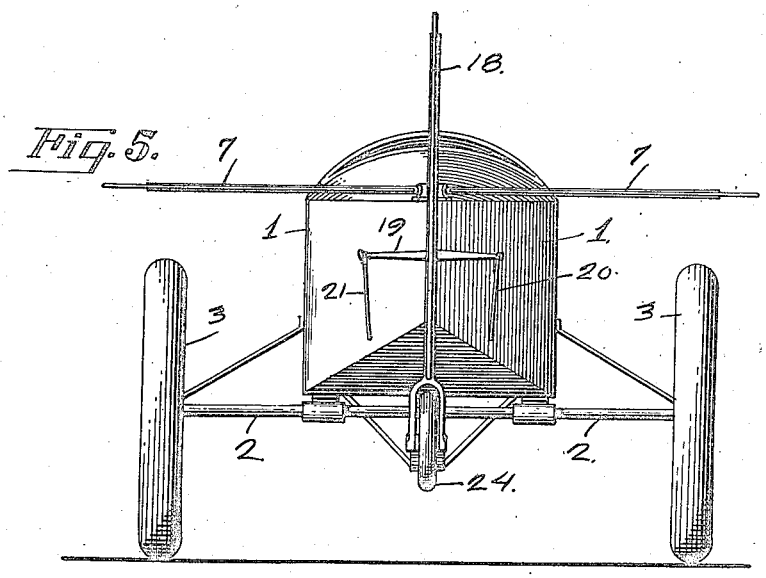

UNITED STATES PATENT OFFICE.

WALDEMAR E. DOYAL AND RALPH HAGOPIAN, OF BERKELEY, CALIFORNIA.

VEHICLE.

1,426,719. Specification of Letters Patent. Patented Aug. 22, 1922.

Application filed December 20, 1919. Serial No. 348,219.

*To all whom it may concern:*

Be it known that we, WALDEMAR E. DOYAL and RALPH HAGOPIAN, citizens of the United States, residing in the city of Berkeley, county of Alameda, and State of California, have invented a certain new and useful Improvement in a Vehicle, of which the following is a specification.

Our invention relates to improvements in vehicles for land travel wherein an air propeller operates to drive the vehicle and air resisting means operate to steer, and to balance said vehicle upon a pair of parallel wheels when impelled along the ground.

The primary object of our invention is to provide a new and improved propelled vehicle;

A further object of our invention is to provide a new and useful improved vehicle having a minimum resistance to the atmosphere as well as a minimum tractive resistance whereby great speed may be obtained.

It is also an object of the present invention to provide an air propelled vehicle having means actuated by air resistance for maintaining said vehicle in balance upon a pair of parallel wheels to reduce tractive resistance of said vehicle.

A further object of the invention is to provide a supporting wheel at the rear of the vehicle and attached to the steering rudder by means of which the vehicle may be steered when the steering rudder is operated and the air resistance is insufficient to actuate said rudder.

We accomplish these several objects by means of the device disclosed in the drawings forming a part of the present specification wherein like characters of reference are used to designate similar parts throughout the said specification and drawings, and in which:

Fig. 1 is a plan view of our improved vehicle;

Fig 2 is a broken side elevation thereof disclosing a portion of the controlling mechanism;

Fig. 3 is an enlarged broken detailed view disclosing the steering control;

Fig. 4 is a front elevation of the vehicle; and

Figure 5 is a rear elevation.

Referring to the drawings the numeral 1 is used to designate a vehicle body built preferably on what is known as "stream lines" to present the minimum resistance when moving forward longitudinally.

The body 1 is provided with a transversely disposed axle 2 upon which are mounted supporting wheels 3 arranged parallel to each other. A suitable motor 4 is provided within the body 1 to rotate a suitable propeller 6 to propel the vehicle.

A balanced horizontally disposed rudder 7 is pivotally mounted as at 8 upon the rear end of the body 1 and is provided with an arm 9 connected by means of a connection rod 11 to the upper end of a lever 12 whose lower end is in turn connected by a connecting rod 14 to the lower end of a control lever 16 pivotally mounted in front of the seat 17 of the operator.

The horizontal rudder 7 is adapted to be actuated by air resistance, when said rudder 7 is operated by the control 16 to slightly elevate the forward edge of said rudder 7 thereby slightly inclining the same, to elevate the rear end of the body 1 and thereby retain said body in equilibrium or in a balanced position on the wheels 3 thereby reducing tractive resistance to a minimum whereby energy usually consumed or dissipated by said tractive resistance may be utilized to propel the vehicle.

A vertically disposed rudder 18 is pivotally mounted upon the rear end of the body 1 and provided with a tiller bar 19 connected by means of suitable cords 20 and 21 to a foot lever 22 pivotally mounted as at 23 to the floor of the body 1 and directly in front of the control lever 16.

Rigidly connected to the vertical rudder 18 is a small wheel 24 adapted to support the rear end of the body 1 when at rest and also at low speeds when the air resistance is insufficient to actuate the horizontal rudder 7. In this case the vehicle is steered by means of said wheel 24, which rests upon the ground when the vertical rudder 18 is operated whereby the course of said vehicle may be effectively controlled and altered.

The wheels 3 are supplied with brake drums 27 engageable by suitable braking mechanism 28 whereby the progress of the vehicle may be arrested when desired.

In operation the vehicle is propelled by rotation of the propeller 6. When traveling at a comparatively low rate of speed the resistance of the air may not be sufficient to actuate the steering rudder 18 in which case said rudder is operated by the foot lever 22 which in turn actuates the wheel 24 supporting the rear end of the body 1 to steer the vehicle. When a sufficient velocity is obtained to cause the air resistance to actuate the rudders the control lever 16 is operated to actuate the horizontal rudder 7 and slightly elevate the forward end thereof.

While in this position the vertical component of the air resistance effective against the undersurface of said rudder 7 elevates the rear end of the body 1 so that the wheel 24 is raised from the ground and the body 1 is in equilibrium or balanced upon the parallel wheels 3 thereby reducing tractive resistance to a minimum. While in this position the vertical or steering rudder 18 is operated by the foot lever 22 and actuated by air resistance to steer the course of the vehicle.

A very high rate of speed may be thus obtained for the reason that substantially the entire amount of energy is expended in driving or propelling the vehicle forward and therefore a greater rate of speed is obtained than would be possible with an aeroplane of the same power for the reason that no portion of said energy would be required to support the weight of the vehicle, and said vehicle would be also lightened by the omission of the supporting planes thereby further reducing the weight to be propelled as well as eliminating the resistance such supporting planes present during a forward movement of said vehicle.

It is obvious from the foregoing that we have provided a new and improved vehicle adapted to attain a very high rate of speed for travel upon the ground as well as improved means for steering said vehicle when traveling at a low rate of speed.

It is also obvious that various types of rudders and means for their operation may be employed without departing from the spirit of the invention.

Therefore, the details of construction being so susceptible to variation we do not wish to confine ourselves to the precise construction and arrangement shown herein but rather to avail ourselves of any modification that may fall properly within the scope of our invention.

Having thus described our invention what we claim as new and desire to secure by Letters Patent is:

1. As an article of manufacture, a vehicle for ground travel comprising a wingless body; a pair of parallel supporting wheels mounted upon said body slightly in advance of the center of gravity thereof; an air propeller operatively mounted upon the body to propel the vehicle along the ground by air displacement; horizontal elevating rudders pivotally mounted upon the rearward end of the vehicle for balancing the body upon the wheels by air resistance against said rudders when the vehicle is in motion; a vertically disposed steering rudder mounted between the elevating rudders to operate by air resistance thereagainst to steer the course of the vehicle, the balancing and the steering of the vehicle along the ground giving a sensation similar to flying without the attendant dangers of actual flight and thereby affording a safe means of practice preliminary to flying.

2. As an article of manufacture, a vehicle for ground travel comprising a wingless body; a pair of parallel supporting wheels mounted upon said body slightly in advance of the center of gravity thereof; an air propeller operatively mounted upon the body to propel the vehicle along the ground by air displacement; horizontal elevating rudders pivotally mounted upon the rearward end of the vehicle for balancing the body upon the wheels by air resistance against said rudders when the vehicle is in motion; a vertically disposed steering rudder mounted between the elevating rudders to operate by air resistance thereagainst to steer the course of the vehicle, the balancing and the steering of the vehicle along the ground giving a sensation similar to flying without the attendant dangers of actual flight and thereby affording a safe means of practice preliminary to flying; and brakes operatively mounted in connection with the wheels to retard the progress of the vehicle when desired.

3. As an article of manufacture, a vehicle for ground travel comprising a wingless body; a pair of parallel supporting wheels mounted upon said body slightly in advance of the center of gravity thereof; an air propeller operatively mounted upon the body to propel the vehicle along the ground by air displacement; horizontal elevating rudders pivotally mounted upon the rearward end of the vehicle for balancing the body upon the wheels by air resistance against said rudders when the vehicle is in motion; a vertically disposed steering rudder mounted between the elevating rudders to operate by air resistance thereagainst to steer the course of the vehicle, the balancing and the steering of the vehicle along the ground giving a sensation similar to flying without the attendant dangers of actual flight and thereby affording a safe means of practice preliminary to flying; and a wheel mounted upon the rearward end of the body and connected with the steering rudder thereon to support and steer the vehicle when the forward movement is not sufficient to cause the air resistance against the elevating planes to lift said rearward end to a balancing position.

4. A vehicle for ground travel comprising a wingless body; a pair of wheels mounted upon said body slightly in advance of the center of gravity thereof to support said body upon the ground; an air propeller operatively mounted upon the body to propel the vehicle along the ground by displacement of air; a pair of horizontally disposed elevating rudders pivotally mounted upon the rearward end of the body upon opposite sides thereof; a vertically disposed operating lever pivotally mounted within the forward portion of the body; connections between said operating lever and the elevating rudders for moving said rudders to balance the body upon the wheels by air resistance against said rudders when the vehicle is in motion; a vertically disposed steering rudder pivotally mounted upon the rear of the vehicle between the elevating rudders; a horizontally disposed foot lever pivotally mounted at the center thereof in front of the operating lever; connections between the ends of said foot lever and the corresponding sides of the steering rudder for moving said rudder to offer resistance to the passage of air upon either side of the body whereby the vehicle may be steered, the steering and balance of the vehicle along the ground giving a sensation similar to flying without the attendant dangers of actual flight and thereby affording a safe means of practice preliminary to flying; a wheel mounted upon the rearward end of the body in connection with the steering rudder and adapted for pivotal movement therewith to support and steer the vehicle when the forward movement of the vehicle is not sufficient to cause the air resistance against the elevating rudders to lift the rearward end of the body to the balancing position; and brakes mounted in connection with the supporting wheels to retard the progress of the vehicle when desired.

In witness whereof we hereunto set out signatures.

WALDEMAR E. DOYAL.
RALPH HAGOPIAN.